United States Patent [19]

Hasegawa et al.

[11] Patent Number: 5,438,468
[45] Date of Patent: Aug. 1, 1995

[54] ROTARY HEAD DRUM HAVING REDUCED EXTERIOR DIMENSIONS

[75] Inventors: Shinichi Hasegawa, Chiba; Akihiro Uetake, Tokyo, both of Japan

[73] Assignee: Sony Corporation, Japan

[21] Appl. No.: 226,440

[22] Filed: Apr. 12, 1994

Related U.S. Application Data

[63] Continuation of Ser. No. 914,827, Jul. 15, 1992, abandoned.

[30] Foreign Application Priority Data

Jul. 18, 1991 [JP] Japan .................................. 3-177893

[51] Int. Cl.6 .............................................. G11B 5/52
[52] U.S. Cl. ...................................... 360/107; 360/85; 360/130.24
[58] Field of Search .............. 360/84, 85, 107, 130.22, 360/130.23, 130.24

[56] References Cited

U.S. PATENT DOCUMENTS

| | | | |
|---|---|---|---|
| 4,814,910 | 3/1989 | Kaku et al. | 360/85 |
| 4,891,726 | 1/1990 | Suwa et al. | 360/84 |
| 5,195,001 | 3/1993 | Murakami et al. | 360/85 |

FOREIGN PATENT DOCUMENTS

| | | | |
|---|---|---|---|
| 90375 | 10/1983 | European Pat. Off. | 360/84 |
| 61-242319 | 10/1986 | Japan | 360/130.24 |
| 1-78413 | 3/1989 | Japan | 360/130.24 |

*Primary Examiner*—Stuart S. Levy
*Assistant Examiner*—Paul J. Ditmyer
*Attorney, Agent, or Firm*—Pasquale Musacchio; Jerry A. Miller

[57] ABSTRACT

An rotary drum head for recording and/or reproducing a signal on slanted tracks formed on a magnetic tape. A chassis is provided with a rotary head drum unit having a lower stationary drum mounted on the chassis in an inclined position. A rotary drum is rotatably and coaxially mounted above the lower stationary drum. A transducer is mounted on a periphery of the rotary drum. A motor rotates the rotary drum. An upper stationary drum is coaxially mounted above the rotary drum wherein an upper portion of the upper stationary drum at the farther side from the chassis is cut so that total height of the rotary head drum unit is reduced.

10 Claims, 4 Drawing Sheets

ROTARY HEAD DRUM HAVING REDUCED EXTERIOR DIMENSIONS

This is a continuation of application Ser. No. 07/914,827 filed on Jul. 15, 1992 which is hereby incorporated by reference and now abandoned.

BACKGROUND

1. Field of the Invention

This invention relates generally to the field of rotary head drums for magnetic tape recording and/or playback devices such as video tape recorders. More particularly, this invention relates to a helical scan rotary head drum having a reduced height which is advantageous for miniaturization of video cassette recorders (VCR).

2. Background of the Invention

In a conventional video cassette recorder (VCR), a S/R helical scan type rotary head drum is used. It carries a transducer for recording and/or reproducing a video signal on a magnetic tape. It is mounted on a VCR chassis in an inclined position. The rotary head drum has a lower stationary (or fixed) drum and an upper rotary drum rotatably mounted on an axis of the lower stationary drum. The lower stationary drum has an inclined tape lead on its outer surface for guiding a magnetic tape. The upper rotary drum has, for example, a pair of transducers at its lower edge. The transducers protrude from the outer surface of the drums by a predetermined amount. As the rotary head drum rotates, slanted tracks are provided on the magnetic tape.

A tape loading mechanism having loading guides and inclined guides draws the magnetic tape from a tape cassette so that the rotary head drum is wrapped with the magnetic tape helically. As the rotary head drum rotates and the transducers scan the magnetic tape, slanted tracks are provided on the magnetic tape.

This type of conventional VCR has several disadvantages as follows. Since the rotary head drum is mounted on the chassis in an inclined position, the vertical height (distance between the highest point and the lowest point of the drum) required to enclose the drum is greater than if the drum were mounted perpendicular to the chassis. Therefore, a VCR using such a drum is limited in height by this vertical height. In addition, during a so-called M loading operation where a tape cassette is positioned near the rotary head drum, the rotary head drum cannot be put into the front opening of the tape cassette due to the height of the rotary head drum. Therefore, the minimum depth of the VCR is limited as is the minimum size of the VCR.

On the other hand, a different type of VCR has been designed. In that VCR, a rotary head drum is mounted vertically on a VCR chassis to make the VCR size smaller. However, it requires more than four inclined tape guides in a tape path. Compared with a helical scan type VCR, it needs more tape guides and adjustment of the tape guides is more complex.

SUMMARY OF THE INVENTION

It is an object of the present invention to provide an improved VCR head having reduced height requirements when mounted at an incline.

It is an advantage that reduced height of a VCR head permits overall reduced VCR size.

These and other, advantages and features of the invention will become apparent to those skilled in the art upon consideration of the following description of the invention.

In one embodiment of the present invention a rotary drum head for recording and/or reproducing a signal on slanted tracks formed on a magnetic tape is provided. A chassis is provided with a rotary head drum unit having a lower stationary drum mounted on the chassis in an inclined position. A rotary drum is rotatably and coaxially mounted above the lower stationary drum. A transducer is mounted on a periphery of the rotary drum. A motor rotates the rotary drum. An upper stationary drum is coaxially mounted above the rotary drum wherein an upper portion of the upper stationary drum at the farther side from the chassis is cut so that total height of the rotary head drum unit is reduced.

In another embodiment, an apparatus for recording and/or reproducing a signal on slanted tracks formed on a magnetic tape, includes a chassis and a shaft obliquely mounted on the chassis. A lower stationary drum is mounted around the shaft. An upper stationary drum is mounted around the shaft and above the lower stationary drum. A bearing is mounted around the shaft. A rotary drum is rotatably mounted around the bearing means between the lower and upper stationary drums. A transducer is mounted on a periphery of the rotary drum for recording and/or reproducing a signal on a magnetic tape. A motor is used to rotate the rotary drum.

In another aspect of the invention, a tape recorder head drum, includes a substantially cylindrical rotary drum. A stationary drum coupled to the rotary drum. The rotary drum and the stationary drum are mounted on an incline relative to a reference plane to permit alignment with slanted tracks on a magnetic tape. The stationary drum deviates from a cylindrical profile such that a maximum distance from the reference plane is less that of a cylindrical profile.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DESCRIPTION OF THE INVENTION

Figure 1:
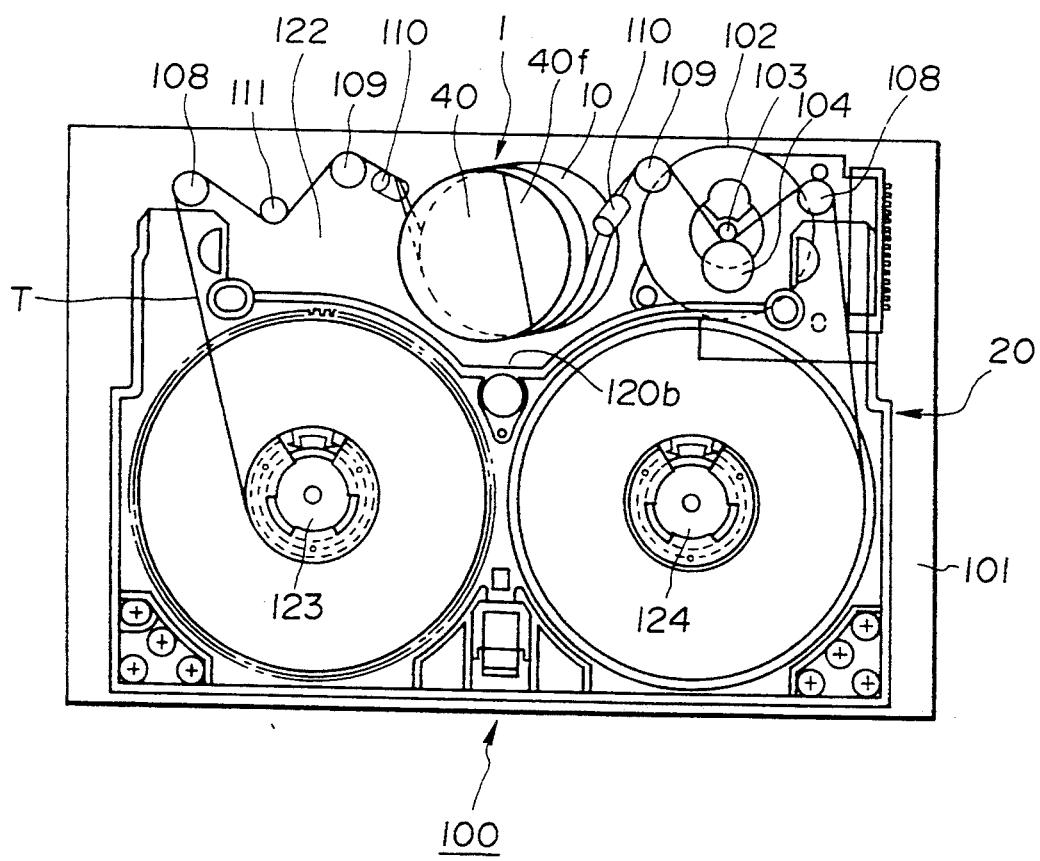
FIG. 1 shows a top view of a VCR according to the invention.

FIG. 1 shows a top view of a VCR 100 according to the present invention. On a chassis 101, a helical scan type rotary head drum unit 1 is mounted in an inclined postion.

Figure 2:
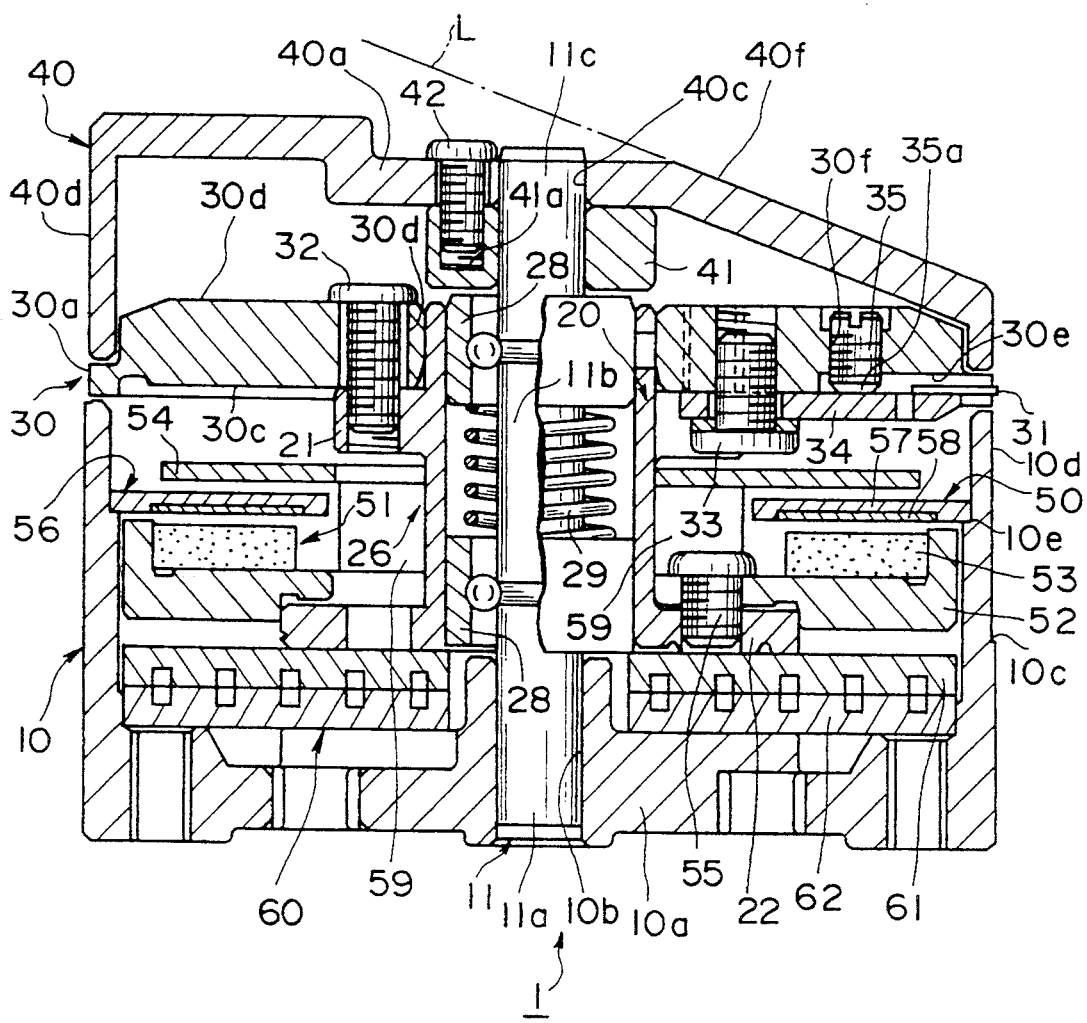
FIG. 2 shows a sectional view of the VCR head of the invention.

As shown in FIG. 2, the rotary head drum unit 1 has a lower stationary drum 10, a cylindrical shape bearing housing 20, a disc-shaped rotary drum 30, an upper stationary drum 40, a coreless motor 50 and a rotary transformer.

Lower portion 11, a fixed axis 11 slantedly mounted on chassis 101 is inserted into centerhole $10_b$ provided at the center of the bottom $10_a$ of lower stationary drum 10. Cylindrical shaped bearing housing 20 is rotatably supported around a middle portion $11_b$ of fixed axis 11 through a pair of ball bearings 28 and 28. Disc-shaped rotary drum 30 carries a transducer 31 on its outer surface $30_a$. Transducer 31 protrudes somewhat toward the outside. Upper stationary drum 40 is mounted around an upper portion of fixed axis 11, facing disc-shape rotary drum 30 with a predetermined clearance. Coreless motor 50 has a rotor 51 fixed around a lower portion of bearing housing 20 and a stator 56 fixed on lower stationary drum 10. There is clearance (about 0.3 mm) respectively between a magnet 53 of rotor 51 and stator 56 and between a back yoke 54 of rotor 51 and stator 56. Rotary transformer has a pair of transformer coils 61 and 62 facing each other. A first transformer coil 61 is mounted on a bottom of bearing housing 20. A second transformer coil 62 is mounted on an upper surface of the bottom $10_a$ of lower stationary drum 10. This rotary transformer 60 is used for supplying a video signal to be recorded to transducer 31 and for receiving a video signal reproduced by transducer 31.

Lower stationary drum 10 is cylindrical and has a bottom. Tape lead $10_c$ for guiding a magnetic tape from a tape cassette 120 is provided on outer surface $10_d$ of lower stationary drum 10. On the bottom $10_a$ of lower stationary drum 10, a flexible circuit board (not shown) interfaces between second transformer coil 62 of rotary transformer 60 and the drum's outside.

Figure 3:
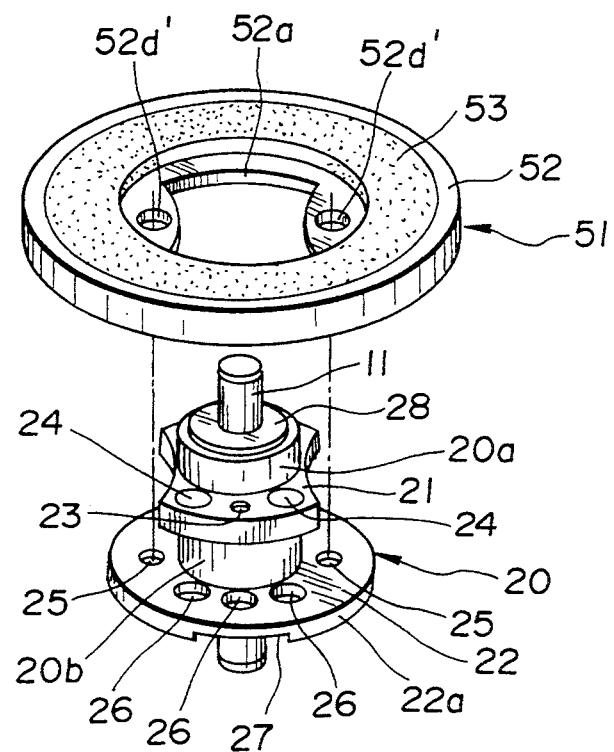
FIG. 3 is a view of the bearing and rotor of the head of the invention.

As shown in FIGS. 2 and 3, upper and lower flanges 21 and 22 are integrally made at the upper and lower portions of the bearing housing. Upper flange 21 has a pair of protrusions at the centers of which screw holes 23 (for mounting rotary drum 30) are provided an outer surface $20_a$ of upper flange 21 is a reference surface for centering a position of rotary drum 30. On upper flange 21, two pairs of holes 24 are provided at both sides of screw holes 23. Lower flange 21 is disc shaped. A pair of screw holes 25 for mounting rotor 51 are provided at the positions of lower flange 22 90° apart from the positions of screw holes 23. An outer surface $22_a$ of lower flange 22 is a reference surface for centering a position of rotor 51 with respect to lower flange 22. Between the two screw holes 25, there are three holes $26_s$ and a recess 27 on the lower side surface of lower flange 22.

As shown in FIG. 2, between a pair of ball bearings 28 in bearing housing 20, a compressed coil spring 29 is provided to give a biasing force to the pair of ball bearings 28. Rotary drum 30 has a step protrusion $31_a$ at its periphery and a hole $30_d$ at its center. Bearing housing 20 is inserted into hole $30_d$. Rotary drum 30 is positioned on upper flange 21 of bearing housing 20 with lower surface $30_c$ of rotary drum 30 touching the upper surface of upper flange 21. Rotary drum 30 and upper flange 21 are attached by screw 32 going into screw hole 23 on upper flange 21.

A head base 34 for supporting transducer 31 is attached in recess $30_e$ provided on lower surface $30_c$ of rotary drum 30 by screw 33. At the end of head base 34, transducer 31 is attached preferably by glue. The height of the end of head base 34 is adjustable by adjusting a bearing adjustment screw 35 inserted into screwed hole $30_f$ provided on rotary drum 30 so that the height of transducer 31 is adjusted.

Upper stationary drum 40 is cylindrical and has an upper portion $40_a$. Around the center of upper portion $40_a$, there is a recess where center hole $40_c$ is provided. Upper portion $11_c$ of fixed axis 11 is inserted into center hole $40_c$. The lower surface of the recess of upper stationary drum 40 is positioned on a disc-shaped flange 41 which is inserted mounted around upper portion $11_c$ of fixed axis 11. Upper stationary drum 40 and flange 41 are fixed by screws 42 inserted into screw holes $41_a$. Peripheral surfaces $10_d$, $30_a$ and $40_d$ of lower stationary drum 10, rotary drum 30 and upper stationary drum 40 are in a single cylindrical plane for the magnetic tape to run. In this particular embodiment, 8 mm width magnetic tape is used and the wrap angle of the tape around rotary head drum unit is about 178 degrees.

Figure 6:
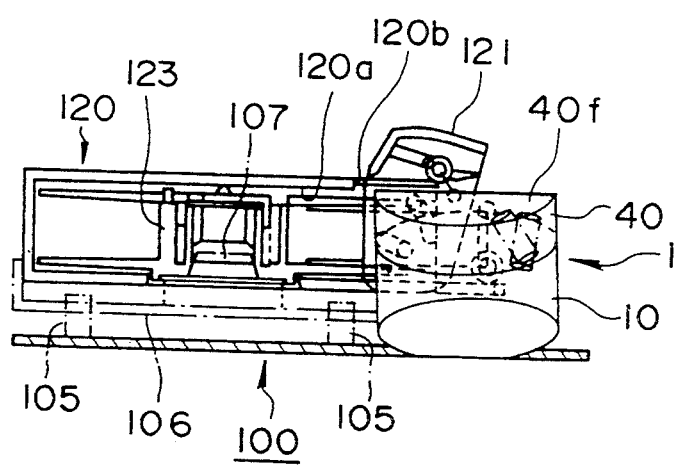
FIG. 6 shows the present invention in a linear skatable chassis.

In FIG. 2, the upper right portion of upper stationary drum 40 is tapered as shown by line L. In this embodiment, the angle defined by line L and the rotating axis of rotary head drum unit is set at 20 degrees. The taper can be made by cutting or die-casting or other suitable process. The taper angle of tapered plane $40_f$ is determined based on the angle of lower stationary drum 10 and chassis 101. Basically, these angles are equal. The depth of taper is determined so that, as shown in FIGS. 1 and 6, upper stationary drum 40 does not touch the inner surface 120, (ceiling) of the upper half of tape cassette 120 when the tape loading is complete. In other words, tapering must be done up to the point where the whole rotary head drum unit resides inside a front opening recess $120_b$ of tape cassette 120. This means that, as shown in FIG. 2, the highest point of upper stationary drum 40, including the head of screw 42 must be under cut at line L. Since tapered plane $40_f$ is provided at the side where magnetic tape T does not wrap upper stationary drum 40 (right hand side in FIG. 1), the taper does not affect the path of magnetic tape T at all. The direction of the largest taper is in the direction of minus 173 degree if the tape width is 8 mm and the diameter of rotary head drum unit is 21 mm.

Figure 4:
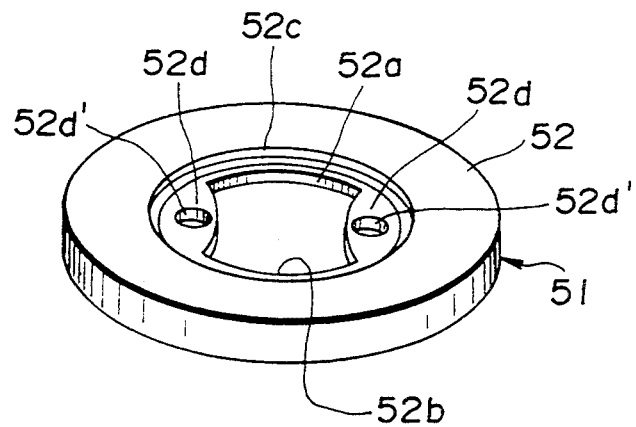
FIG. 4 is a view of the rotor of the invention.

As shown in FIG. 2, rotor 51 of coreless motor 50 has a dish-shaped rotor case 52, a donut-shaped magnet 53 inside rotor case 52 and a disc-shaped back yoke 54. Rotor 51 is mounted on lower flange 22 of bearing housing 20 by screw 55. As shown in FIGS. 3 and 4, rotor case 52 has a hole $52_a$ so that upper flange 21 of bearing housing 20 can be through hole $52_a$. Rotor case 52 also has a ring-shaped recess $52_b$ on its back surface. The inner peripheral surface $52_c$ of recess $52_b$ is a reference surface for centering the position of lower flange 22 of bearing housing 20. There are a pair of mount portions $52_d$ inside recess $52_b$. Mount portions $52_d$ have holes $52_d$ through which shank of screws 55 directly receive upper surface of lower flange 22, the surface of mount portions $52_d$ is about 50 μ higher than the surface of recess $52_b$.

As shown in FIG. 2, back yoke 54 of rotor 51 is mounted on a pair of back yoke supports 59 and 59 which are provided 180 degrees apart from each other, between upper and lower flanges 21 and 22. Back yoke 54 is three-layer anti-vibration construction in which resin is sandwiched by metal plates. Back yoke support 59 is made of polyester elastomer resin or rubber which has a damping effect.

Stator 56 of coreless motor 50 has a disc-shaped stator base and plural-phase coil 58 under stator base 57. Peripheral of stator base 57 is mounted by glue to step portion $10_e$ which is provided in a inner peripheral of lower stationary drum 10. Plural-phase coil 58 of stator 56 faces magnet 53 of rotor 51 with clearance of about 0.3 mm.

First transformer coil 61 of rotor side is mounted on the lower surface of lower flange 22 of bearing housing. Second transformer coil 62 of stator side is mounted on the upper surface of bottom $10_a$ of lower stationary drum 10. First and second transformer coils 61 and 62 face each other with clearance of about 25 $\mu$, for example. As shown in FIG. 3, signal cables (not shown) coming from first transformer coil 61 of rotor side pass through recess 27 of lower flange 22 holes 26 and holes 24. The cable finally reaches a circuit board (not shown) mounted on upper surface $30_b$ of rotary drum 30 as shown in FIG. 2. The signal is thus received from and supplied to transducer 31 through the circuit board.

Referring back to FIG. 1, a capstan motor 102 is arranged at the right hand side of rotary head drum unit 1 which is mounted on chassis 101 in an inclined position. A pinch roller 104 is moveable toward and apart from a capstan 103 driven by capstan motor 102.

Figure 5:
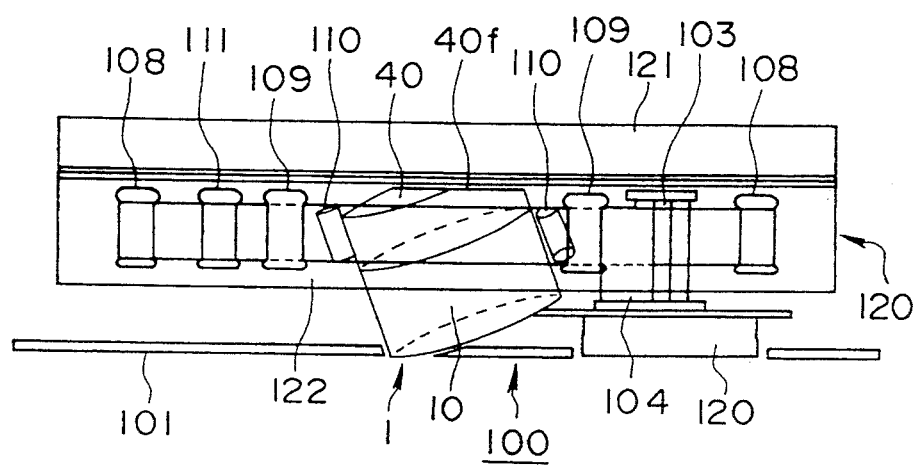
FIG. 5 shows the positioning of the head and tape guides in a VCR.

As shown in FIG. 6, a linear skatable chassis 106 is supported by four supporting pins 105 and it is horizontally moveable toward and away from rotary head drum unit 1 by a drive mechanism (not shown). On this linear skatable chassis 106, a pair of reel receivers 107 and 107 are rotatably supported and a pair of positioning pins (not shown) for positioning tape cassette 120 are mounted. As shown in FIGS. 1 and 5, a pair of loading guides, 108 and 108, a pair of vertical roller guides, 109 and 109, a pair of inclined guides, 110 and 110 and a tension adjustment guide 111 are arranged around a rotary head drum unit 1. These guides are driven between loading and unloading positions by a conventional tape loading mechanism.

By the time that linear skatable chassis 106 carries tape cassette 120 to the loading position as shown in FIG. 1, a lid 121 of tape cassette 120 is opened by pins (not shown) provided on linear skatable chassis 106. Upon the completion of loading movement, upper stationary drum 40 of rotary head drum unit 1 enters into the front opening space 122 which is defined by lid 121 of tape cassette 120 and opening recess $120_b$ in a midfront position of tape cassette 120. In FIG. 1, reference numbers 123 and 124 show reels of tape cassette 120.

As explained above, VCR 100 using rotary head drum unit 1 according to the present invention can have reduced height because the upper portion (highest portion) of upper stationary drum 40 is parallel with the ceiling of VCR 100. The relative height of tape cassette 120 and rotary head drum unit 1 with respect to chassis 101 is constant even when they are moving in parallel.

Furthermore, the highest point of rotary head drum unit 1 is lower than ceiling $120_a$ of tape cassette 120 which is positioned onto a pair of reel receivers 107 of linear skatable chassis 106 on chassis 101. Therefore, rotary head drum unit 1 is able to enter into opening space $120_b$ in a front mid-portion of tape cassette 120 upon the completion of the loading movement of linear skatable chassis 106. Because the distance between rotary head drum unit 1 and reels 123 and 124 of tape cassette 120 can be shorter, the depth of chassis 101 can also be shorter. Accordingly, size reduction of the VCR becomes possible. Of course, rotary head drum unit 1 stands obliquely on chassis 1, and thus a small number of tape guides including inclined tape guides and adjustment of the guides are required.

Furthermore, in the above embodiment, periphery $57_a$ of stator base 57 is mounted on step portion $10_e$ of lower stationary drum 10 by glue. Therefore, the stability of stator 56 increases and undesired vibration of stator 56 due to the rotation of rotor 51 can be reduced. Back yoke 54 has anti-vibration characteristic because of three-layer construction; two metal plates and resin between them. Back yoke support 50 is made of material such as polyester elastomer. Therefore, vibration of back yoke 54 can be reduced. As a result, undesired vibration sound of motor 50 caused by vibration of stator 56 and back yoke 54 during the rotation of motor 50 can be reduced or eliminated.

Because of the construction of motor 50 described above, rotor case 52 of rotor 51 can be mounted on lower flange 22 without tacking (interfering) upper flange 21 and bigger sizes of upper flange 21 and magnet 53 can be used. Easy and low cost centering of rotor 51 with respect to bearing housing is achieved because peripheral surface $22_a$ of lower flange 22 and inside recess $52_b$ on lower surface of rotor case 52 are centering reference surfaces.

Although disc-shaped rotary drum; so-called propeller type rotary drum, is used in the embodiment, the present invention may be applied to rotary head drum unit using cylindrical rotary drum.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is

1. Apparatus for recording and/or reproducing a signal on slanted tracks positioned at a predetermined angle on a magnetic tape, said apparatus comprising:
   a chassis;
   a rotary head drum unit comprising:
   a lower stationary drum mounted on said chassis in an inclined position suitable for forming said slanted tracks at said predetermined angle such that said magnetic tape travels in a substantially level tape path;
   a rotary drum rotatably and coaxially mounted above said lower stationary drum;
   a transducer mounted on a periphery of said rotary drum;
   rotary means for rotating said rotary drum, said rotary means having a coreless motor which includes a rotor having a disk shaped rotor case and a donut shaped magnet;
   a stator positioned above said magnet;
   a vibration damping element for reducing vibration of said rotary means and said stator, said vibration damping element including a disk shaped back yoke and a support element for supporting said back yoke above said stator;
   an upper stationary drum coaxially mounted above said rotary drum wherein an upper portion of said upper stationary drum at the farther side from said chassis is cut so that the total height of said rotary head drum unit is reduced;
   a shaft extending through said upper stationary drum, said rotary drum and said lower stationary drum;

a bearing housing rotatably attached to said shaft, wherein said bearing housing includes a lower flange and said rotor is secured to said lower flange;

first securing means for securing said shaft to said upper stationary drum such that said first securing means is substantially within said upper stationary drum; and second securing means for securing said shaft to said lower stationary drum such that said second securing means is completely within said lower stationary drum.

2. An apparatus according to claim 1, further comprising:

a moveable tape carrier moveable with respect to said chassis for carrying a tape cassette between loaded and unloaded positions, said tape cassette having said magnetic tape inside and having an opening space in its front side, wherein said rotary head drum unit is positioned in said opening space of said tape cassette when said tape cassette is in said loaded position to enable reduction of the overall size of said chassis.

3. A tape recorder head drum for recording a signal on slanted tracks positioned at a predetermined angle on a magnetic tape, comprising:

a substantially cylindrical rotary drum positioned between upper and lower stationary drums to form a drum assembly, said rotary drum having an outer peripheral surface;

mounting means for mounting said drum assembly on an incline relative to a reference plane to enable formation of said slanted tracks at said predetermined angle on said magnetic tape such that said magnetic tape travels in a substantially level path, wherein said upper stationary drum deviates from a cylindrical profile such that a maximum distance from said reference plane to an upper portion of said upper stationary drum is less than that of said cylindrical profile;

a shaft extending through said upper stationary drum, said rotary drum and said lower stationary drum, said shaft including an upper flange positioned within said upper stationary drum for mating with said upper stationary drum;

first securing means for securing said upper stationary drum to said upper flange such that said first securing means is substantially within said upper stationary drum;

second securing means for securing said lower stationary drum to said shaft such that said second securing means is completely within said lower stationary drum;

a transducer, affixed to said peripheral surface, for recording a signal on said magnetic tape;

rotary means for rotating said rotary drum, said rotary means having a coreless motor which includes a rotor having a disk shaped rotor case and a donut shaped magnet;

a stator positioned above said magnet;

a vibration damping element for reducing vibration of said rotary means and said stator, said vibration damping element including a disk shaped back yoke and a support element for supporting said back yoke above said stator; and a bearing housing rotatably attached to said shaft, wherein said bearing housing includes a lower flange and said rotor is secured to said lower flange.

4. The tape recorder head drum according to claim 3 wherein said upper stationary drum includes a tapered surface and an tipper flat surface.

5. The tape recorder head drum according to claim 3, wherein said upper stationary drum includes a lower flat surface positioned between an upper flat surface and a tapered surface and said first securing means is secured through said lower flat surface.

6. The tape recorder head drum according to claim 5, wherein said first securing means and said shaft are below a plane of said tapered surface.

7. The tape recorder head drum according to claim 3, wherein said upper flange is disc shaped and said first securing means is a fastener for threadably engaging with said upper flange.

8. The tape recorder head drum according to claim 3, further including bearing means for reducing rotational friction between said shaft and said rotary drum.

9. The tape recorder head drum according to claim 3 further comprising a chassis and a moveable tape carrier moveable with respect to said chassis for carrying a tape cassette including said tape between a loaded position adjacent to the tape recorder head drum, for recording on said tape, and an unloaded position away from said tape recorder head drum wherein said tape cassette includes an opening for receiving the tape recorder head drum when said tape is in said loaded position to enable reduction of the overall size of said chassis.

10. A tape recorder head drum for recording a signal on slanted tracks positioned at a predetermined angle on a magnetic tape, comprising:

a substantially cylindrical rotary drum positioned between upper and lower stationary drums to form a drum assembly, said rotary drum having an outer peripheral surface and said upper stationary drum including a lower flat surface positioned between an upper flat surface and a tapered surface;

mounting means for mounting said drum assembly on an incline relative to a reference plane to enable formation of said slanted track at said predetermined angle on said magnetic tape such that said magnetic tape travels in a substantially level path, wherein said upper stationary drum deviates from a cylindrical profile such that a maximum distance from said reference plane to said tapered surface is less than that of said cylindrical profile;

a shaft extending through said upper stationary drum, said rotary drum and said lower stationary drum, said shaft including an upper flange positioned within said upper stationary drum for mating with said upper stationary drum;

a coreless motor for rotating said rotary drum, said coreless motor including a rotor having a disk shaped rotor case and a donut shaped magnet;

a stator positioned above said magnet;

a vibration damping element for reducing vibration of said rotary means and said stator, said vibration damping element including a disk shaped back yoke and a support element for supporting said back yoke above said stator;

a bearing housing rotatably attached to said shaft, wherein said bearing housing includes a lower flange and said rotor is secured to said lower flange;

first securing means secured through said lower flat surface for securing said upper stationary drum to said upper flange such that said first securing means is substantially within said upper stationary drum;

second securing means for securing said lower stationary drum to said shaft such that said second securing means is completely within said lower stationary drum;

a transducer, affixed to said peripheral surface, for recording a single on said magnetic tape; and a chassis and a movable tape carrier moveable with respect to said chassis for carrying a tape cassette including said tape between a loaded position adjacent to the tape recorder head drum, for recording on said tape, and an unloaded position away from said tape recorder head drum wherein said tape cassette includes an opening for receiving the tape recorder head drum when said tape is in said loaded position to enable reduction of the overall side of said chassis.

* * * * *